United States Patent [19]
Wang

[11] Patent Number: 5,746,791
[45] Date of Patent: May 5, 1998

[54] MOISTURE AND CONTAMINANT SEPARATOR FOR COMPRESSED AIR

[76] Inventor: Chun-Wen Wang, P. O. Box 55-846, Taipei, Taiwan

[21] Appl. No.: 794,640

[22] Filed: Feb. 3, 1997

[51] Int. Cl.$^6$ .............................. B01D 59/50; B01D 51/00
[52] U.S. Cl. ........................... 55/337; 55/419; 55/456; 55/DIG. 17
[58] Field of Search .................... 55/337, 399, DIG. 17, 55/240, 419, 456; 366/162.4; 95/272

[56] References Cited

U.S. PATENT DOCUMENTS

| | | | |
|---|---|---|---|
| 795,750 | 7/1905 | Allington | 55/399 |
| 4,027,857 | 6/1977 | Cunningham | 366/340 |
| 4,177,049 | 12/1979 | Haslett, Jr. | 55/DIG. 17 |
| 4,299,602 | 11/1981 | Cordier et al. | 55/240 |
| 4,325,716 | 4/1982 | Livemore | 55/265 |
| 4,541,982 | 9/1985 | Upmeier | 425/378 |
| 4,848,988 | 7/1989 | Suzuki | 55/337 |

*Primary Examiner*—Jay H. Woo
*Assistant Examiner*—Robert Hopkins

[57] ABSTRACT

A moisture and contaminant separator for compressed air includes: an outer cylinder having an upper mist accumulator and a lower water collector; and an inner cylinder secured in a central portion of the outer cylinder having an impinging condenser formed in the inner cylinder provided with a plurality of leftward and rightward oriented air passages in the impinging condenser to allow the crossing impact, impinging, mixing, settling and condensation of water mist or contaminant particles laden in the compressed air stream into the separator to be dropped and collected in the lower water collector of the outer cylinder; upon the primary removal of water and contaminants from the compressed air stream, the mist still carried on the air stream will be accumulated on the inside wall of the upper mist accumulator and then drained into the lower collector for further removal of the mist and contaminants laden in the air; and the demisted dry air will be delivered outwardly through an upper port.

1 Claim, 4 Drawing Sheets

MOISTURE AND CONTAMINANT SEPARATOR FOR COMPRESSED AIR

BACKGROUND OF THE INVENTION

Martin Fiedler disclosed an air dryer system in his U.S. Pat. No. 4,253,315 for removing moisture from compressed air. The system includes a coil means including a plurality of axially spaced convoluted tubing sections wherein each tubing section has an inlet adapted to be coupled to the compressed moist air to be dried and an outlet. The system further includes a cooling means for reducing the temperature of the moist air within the tubing sections for causing the moisture within the compressed air to condense for forming moisture laden air at the outlets, and a moisture separater directly connected to each of the tubing sections for removing the condensed moisture from the moisture laden air to thereby provide dried air for use by pneumatically operated or controlled tools or the like.

However, it requires the complex heat exchanger section (12), refrigerant regenerating section (14), water separater (16), and pre-cooler unit (18) to cause operation and maintenance problems and to increase the installation and operational cost.

The present inventor has found the drawbacks of the conventional air dryer, and invented the present moisture, water or contaminant separator for compressed air such as discharged from an air compressor or compressed air supply system.

SUMMARY OF THE INVENTION

The object of the present invention is to provide a moisture and contaminant separator for compressed air including: an outer cylinder having an upper mist accumulator and a lower water collector; and an inner cylinder secured in a central portion of the outer cylinder having an impinging condenser formed in the inner cylinder provided with a plurality of leftward and rightward oriented air passages in the impinging condenser to allow the crossing impact, impinging, mixing, settling and condensation of water mist or contaminant particles laden in the compressed air stream into the separator to be dropped and collected in the lower water collector of the outer cylinder; upon the primary removal of water and contaminants from the compressed air stream, the mist still carried on the air stream will be accumulated on the inside wall of the upper mist accumulator and then drained into the lower collector for further removal of the mist and contaminants laden in the air; and the demisted dry air will be delivered outwardly through an upper port.

DETAILED DESCRIPTION

Figure 1:
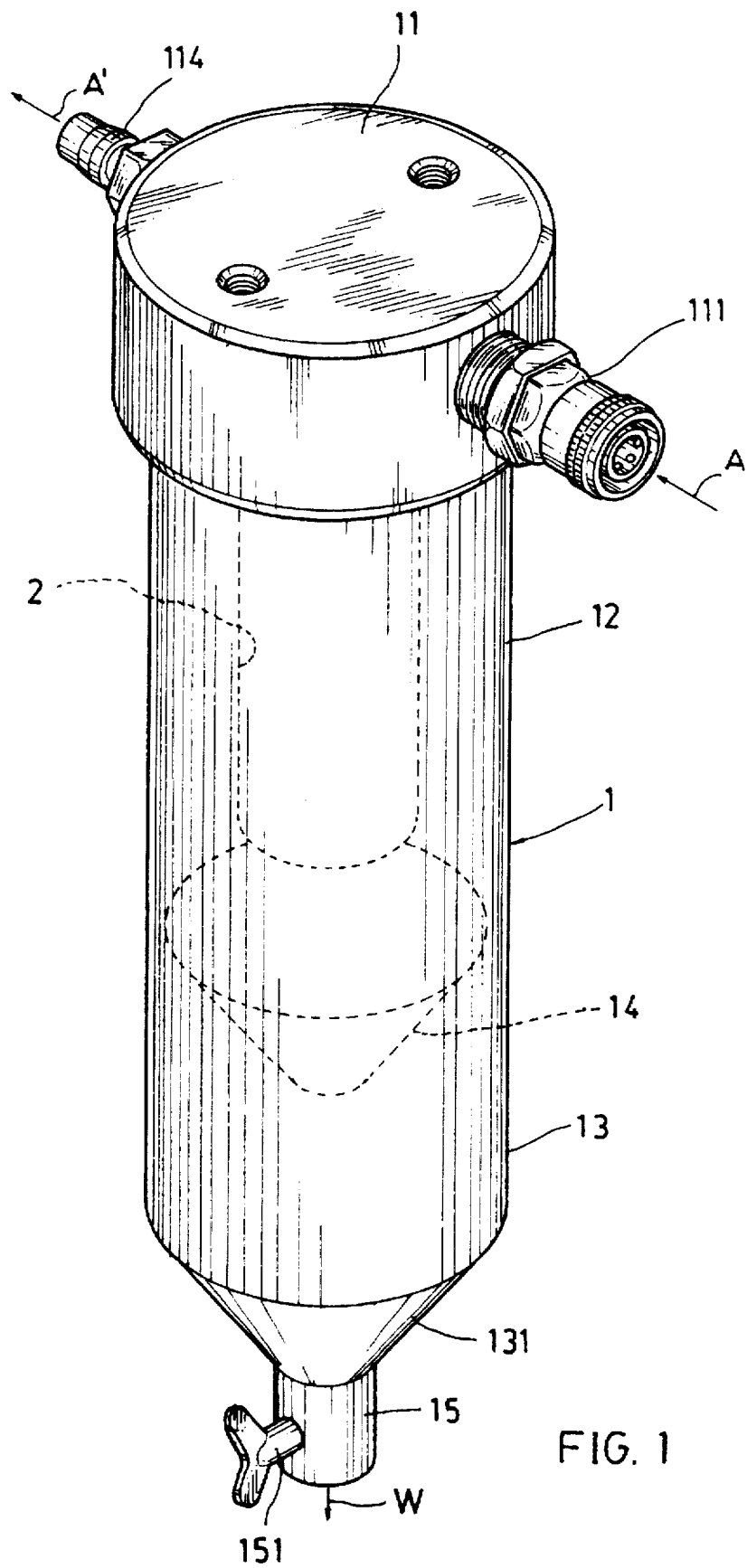
FIG. 1 is a perspective view of the present invention.

As shown in FIGS. 1–4, a moisture and contaminant separator for compressed air of the present invention comprises: an outer cylinder 1 and an inner cylinder 2 secured within the outer cylinder 1 having a plurality of air passages 3 formed in the inner cylinder 2. The compressed air as discharged from an air compressor may be laden with moisture, mist, and contaminants such as dusts, which may be removed by the present invention to obtain a dry clean compressed air for end use.

The outer cylinder 1 includes: a head portion 11, an upper mist accumulator 12 secured under the head portion 11, a lower water collector 13 formed on a lower portion of the upper mist accumulator 12 having a bottom cone portion 131 of the collector 13, a conical baffle 14 formed between the upper mist accumulator 12 and the lower water collector 13, and a discharge pipe 15 connected to a bottom of the lower water collector 13 having a valve 151 formed in the discharge pipe 15 for discharging the collected water W in the lower water collector 13.

The head portion 11 includes: an inlet adapter 111 connected to an compressed air source for leading compressed air stream A into an inlet port 112 communicated with the inlet adapter 111 and the inner cylinder 2; an outlet adapter 114 connected with a compressed air pipe (not shown) for delivering dry clean compressed air (A') outwardly for end use, with an outlet port 113 communicated with the outlet adapter 114 and with the outer cylinder 1.

The upper mist accumulator 12 includes: an upper threaded portion 121 formed on an upper portion 123 of the accumulator 12 to be secured with the head portion 11, at least a helical groove 10 helically recessed in an inside wall of the upper mist accumulator 12 from the upper portion 123 to a bottom portion 122 adjacent to the conical baffle 14 for draining collected mist or water W through the helical groove 10, a conical portion 142 tapered downwardly from the conical baffle 14 and a central hole 141 formed in the central portion of the baffle 14, whereby the water collected in the lower water collector 13 will be discharged by the pipe 15.

The inner cylinder 2 includes: an impinging condenser 21 secured on a top portion of an upper cylinder portion 23 and fixed to the head portion 11 of the outer cylinder 1 by a screw 22 or by lower joining methods, a lower cylinder portion 24 formed on a lower portion of the upper cylinder portion 23 having a bottom hole 241 formed in the bottom of the lower cylinder portion 24 to communicate with the upper mist accumulator 12, a screen 25 formed between the upper cylinder portion 23 and the lower cylinder portion 24 for filtering contaminants or dusts laden in the air stream flowing from the upper cylinder portion 23 to the lower cylinder portion 24, and an annular gap 20 defined between a cylindrical wall 213 of the condenser 21 and an inside wall of the upper cylinder portion 23 to allow compressed air stream flowing through a plurality of air passages 3 formed through the cylindrical wall 213 of the impinging condenser 21 to impact with one another in the annular gap 20 between the condenser 21 and the upper cylinder portion 23 for coagulating the water mists or settling the contaminants downwardly along the inside wall of the upper and lower cylinder portions 23, 24 to be drained downwardly into the lower water collector 13 in the outer cylinder 1.

The impinging condenser 21 includes: a central stem 211 secured to a bottom of the head portion 11 of the outer cylinder 1 by a screw 22, an intermediate chamber 212 concentrically formed in the condenser 21 and confined between the cylindrical wall 213 and the central stem 211 to communicate with the inlet port 112 of the head portion 11, a plurality of leftward oriented air passages 31 volutely leftwardly formed through the cylindrical wall 213 for radially directing a plurality of compressed air streams A1 leftwardly from the intermediate chamber 212, and a plurality of rightward oriented air passages 32 volutely rightwardly formed through the cylindrical wall 213 for radially directing a plurality of compressed air streams A2 rightwardly from the intermediate chamber 212, with the mists or dirts laden in the compressed air streams A1, A2 operatively impacting, mixing, coagulating and condensing with one another in the annular gap 20 between the impinging condenser 21 and the upper cylinder portion 23 of the inner cylinder 2 for gravitationally draining water condensed from the mists into the lower water collector 13.

Figure 4:
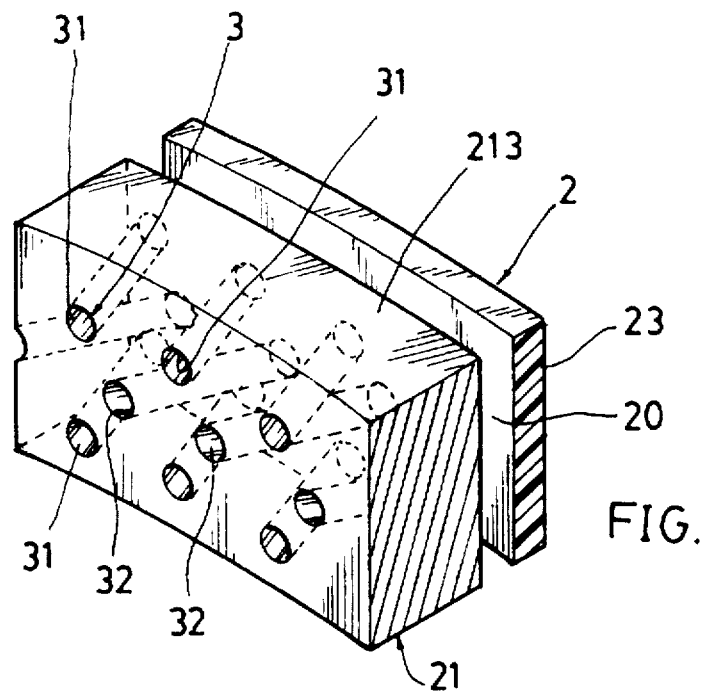
FIG. 4 is a partial illustration showing the impinging condenser of a preferred embodiment of the present invention.
Figure 5:
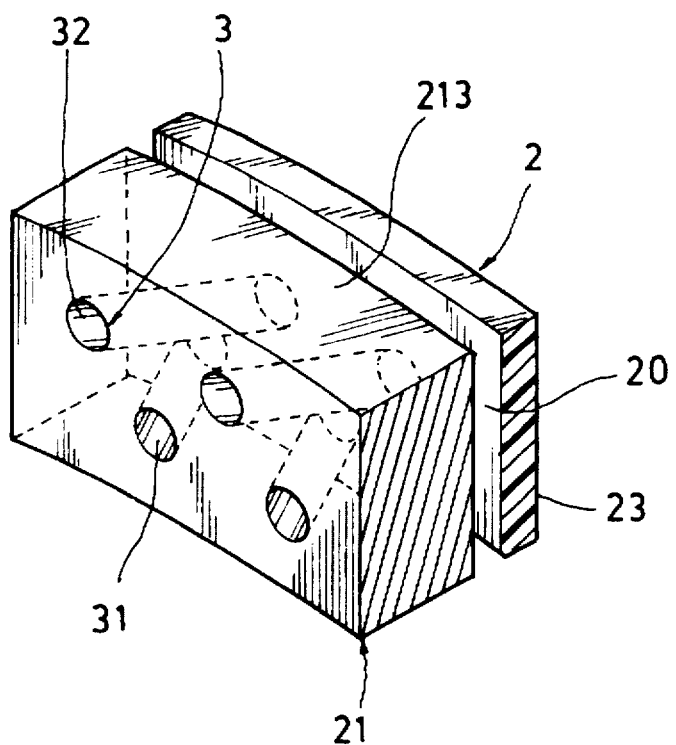
FIG. 5 shows another preferred embodiment of the condenser of the present invention.

The air passages 31, 32 as shown in FIG. 4 may be three "layers", while the air passages in FIG. 5 be two layers, not limited in the present invention.

Figure 2:
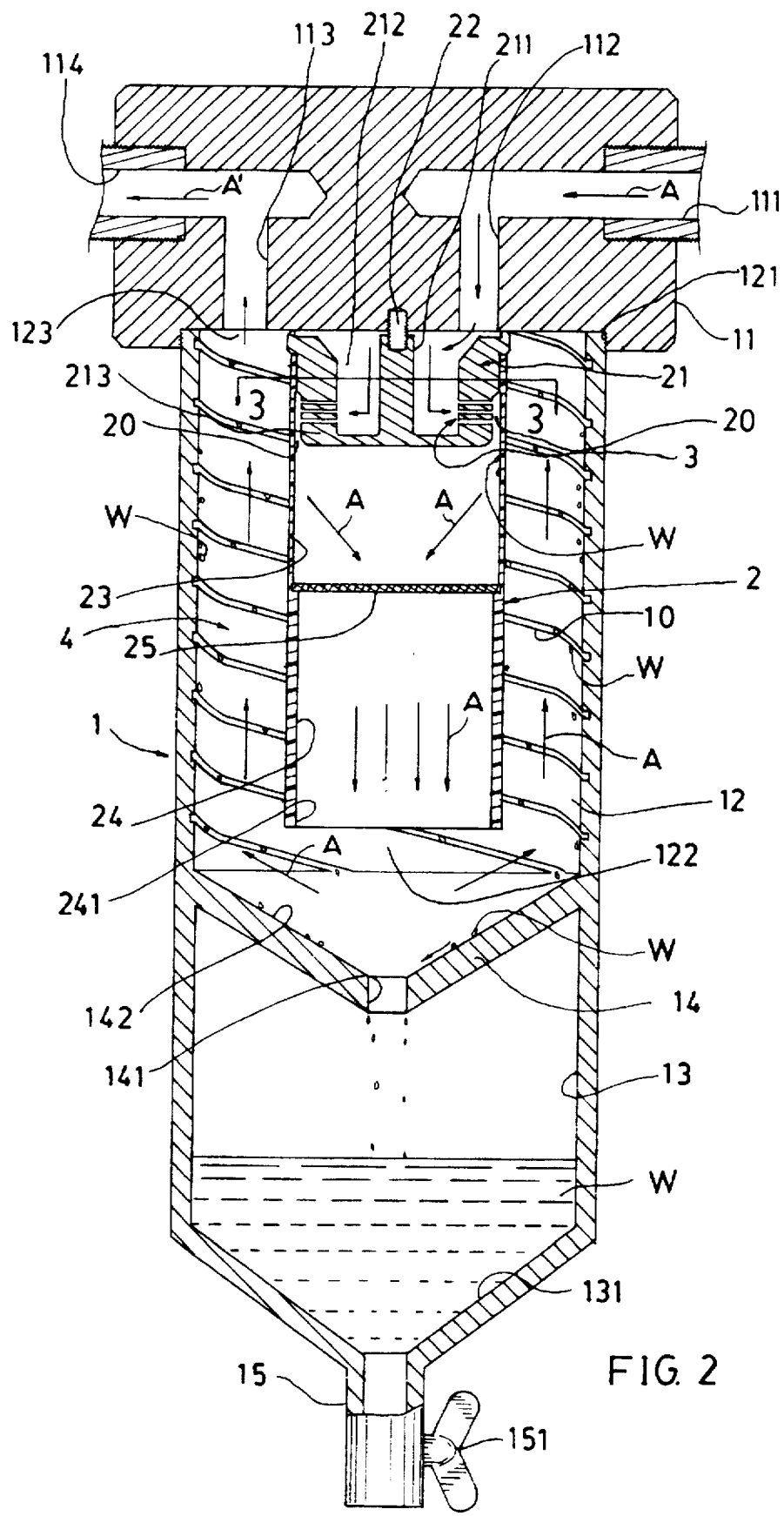
FIG. 2 is a longitudinal sectional drawing of the present invention.
Figure 3:
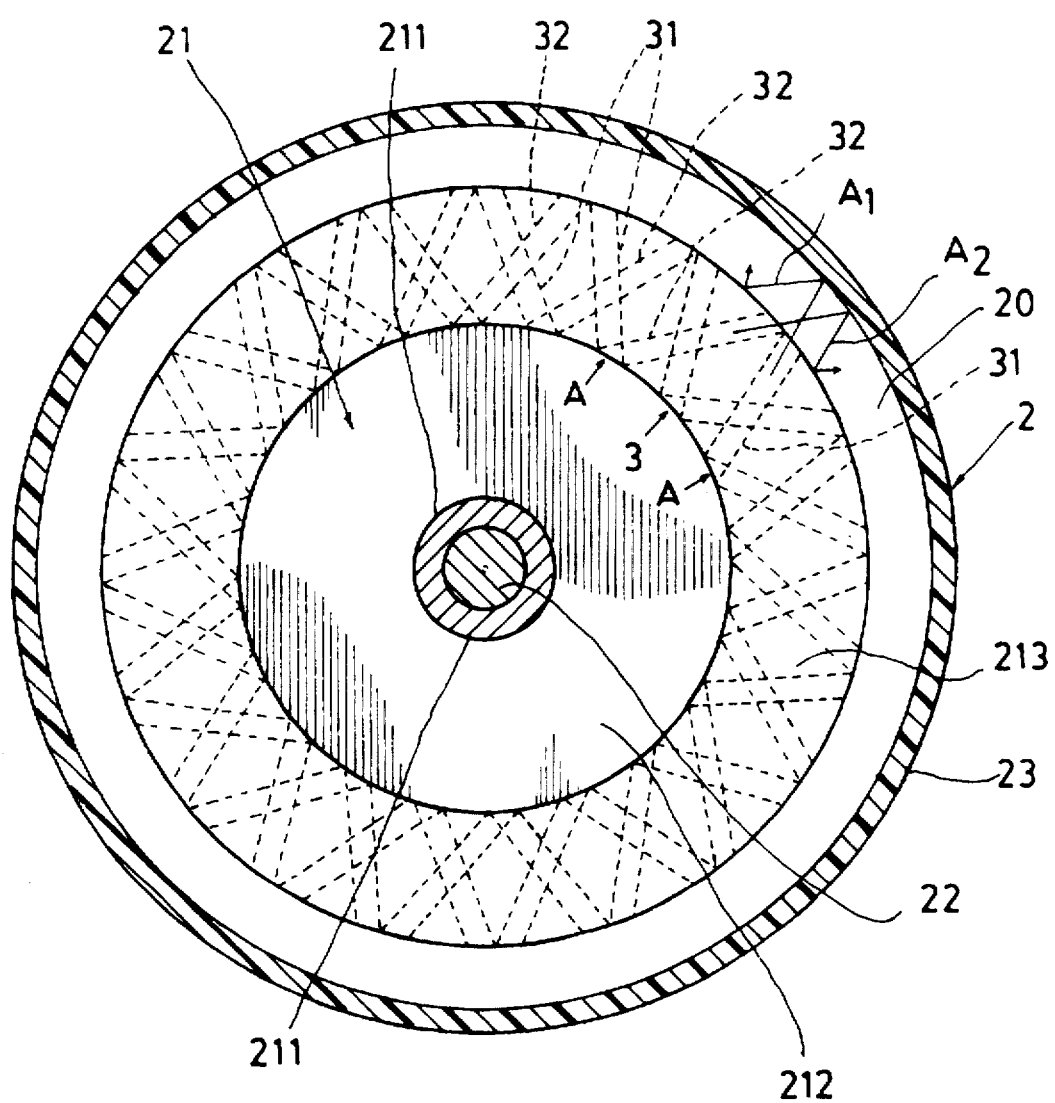
FIG. 3 is a cross sectional drawing of the present invention as viewed from 3—3 direction of FIG. 2.

When using the present invention, the inlet compressed air A is directed into the intermediate chamber 212 of the impinging condenser 21 through the inlet port 112, the air streams will pass through the leftward passages 31 and through the rightward passages 32 as shown in FIGS. 2, 3 to cause crossing impacting, mixing, coagulation of the mists or dirts laden in the compressed air in the annular gap 20, whereby the mists will become water drops W to be gravitationally drained along the inside wall of the upper and the lower cylinder portions 23, 24 to be drained through the conical baffle 14 into the collector 13 formed on a bottom of the outer cylinder 1 where the collected water and dirts may be discharged by opening the valve 151.

The air stream A in the lower cylinder portion 24 will be retarded by the baffle 14 and then will flow upwardly along an annular space 4 defined between the upper mist accumulator 12 and the inner cylinder 2 to allow the remaining mists carried in the air stream A to be caught by the helical groove 10 helically recessed in the upper mist accumulator 12 whereby the water drops will be accumulated in the groove to be a fine water stream W drained along the helical groove 10 and drained into the collector 13 through the cone portion 141 of the baffle 14 for further collecting the water mists and dirts dissolved or suspended in the water, into the collector 13 for waste disposal.

The cleaned dry air A' will be discharged through the upper portion 123 of the outer cylinder 1, the outlet port 113 and outlet adapter 114 for supply to the end user of compressed air.

The present invention is superior to the conventional air dryer because of a simple structure and mechanism is provided to remove the water or dirts laden in the compressed air without providing the expensive and complex refrigerant cooling and regenerating systems.

The present invention may be modified without departing from the spirit and scope of this invention.

I claim:

1. A moisture and contaminant separator for compressed air comprising:

an outer cylinder for directing a compressed air stream into said outer cylinder for removing water and contaminants laden in the compressed air in said outer cylinder and for discharging dry clean compressed air outwardly through said outer cylinder;

an inner cylinder secured within said outer cylinder for passing the compressed air stream therein to impact, mix and coagulate water mists and dirts as laden in the compressed air in said inner cylinder to be water drops or stream to be drained and collected into a bottom of said outer cylinder;

said outer cylinder including: a head portion an upper mist accumulator secured under the head portion, a lower water collector formed on a lower portion of the upper mist accumulator having a bottom cone portion of the collector, a conical baffle formed between the upper mist accumulator and the lower water collector, and a discharge pipe connected to a bottom of the lower water collector having a valve formed in the discharge pipe for discharging water collected in the lower water collector;

said head portion including: an inlet adapter connected to an compressed air source for leading compressed air stream into an inlet port communicated with the inlet adapter and the inner cylinder; an outlet adapter connected with a compressed air pipe for delivering dry clean compressed air outwardly, with an outlet port communicated with the outlet adapter and with the outer cylinder;

said upper mist accumulator including: an upper portion secured with the head portion at least a helical groove helically recessed in an inside wall of the upper mist accumulator from the upper portion to a bottom portion adjacent to the conical baffle for draining water as collected through the helical groove, a conical portion tapered downwardly from the conical baffle and a central hole formed in the central portion of the baffle, said baffle draining the water into the lower water collector having a discharge pipe for discharging water from the collector;

said inner cylinder including: an impinging condenser secured on a top portion of an upper cylinder portion of said inner cylinder and fixed to the head portion of the outer cylinder, a lower cylinder portion formed on a lower portion of the upper cylinder portion having a bottom hole formed in the bottom of the lower cylinder portion to communicate with the upper mist accumulator, a screen formed between the upper cylinder portion and the lower cylinder portion for filtering contaminants laden in a compressed air stream flowing from the upper cylinder portion to the lower cylinder portion and an annular gap defined between a cylindrical wall of the condenser and an inside wall of the upper cylinder portion to allow the compressed air stream flowing through a plurality of air passages formed through the cylindrical wall of the impinging condenser to impact with one another in the annular gap between the condenser and the upper cylinder portion for coagulating the water mists and contaminants downwardly along the inside wall of the upper and lower cylinder portions to be drained downwardly into the lower water collector in the outer cylinder; the improvement which comprises:

said impinging condenser including: a central stem secured to a bottom of the head portion of the outer cylinder, an intermediate chamber concentrically formed in the condenser and confined between the cylindrical wall and the central stem to communicate with the inlet port of the head portion, a plurality of leftward oriented air passages volutely leftwardly formed through the cylindrical wall for radially directing a plurality of compressed air streams leftwardly from the intermediate chamber, and a plurality of rightward oriented air passages volutely rightwardly formed through the cylindrical wall for radially directing a plurality of compressed air streams rightwardly from the intermediate chamber, with the mists and dirts laden in the compressed air streams operatively impacting, mixing, coagulating and condensing with one another in the annular gap between the impinging condenser and the upper cylinder portion of the inner cylinder to be water drops containing dirts to be gravitationally drained into the lower water collector.

* * * * *